Nov. 24, 1936.  E. F. MARRESFORD  2,062,136
SPEED SYNCHRONIZING DEVICE
Filed March 20, 1934  6 Sheets-Sheet 2

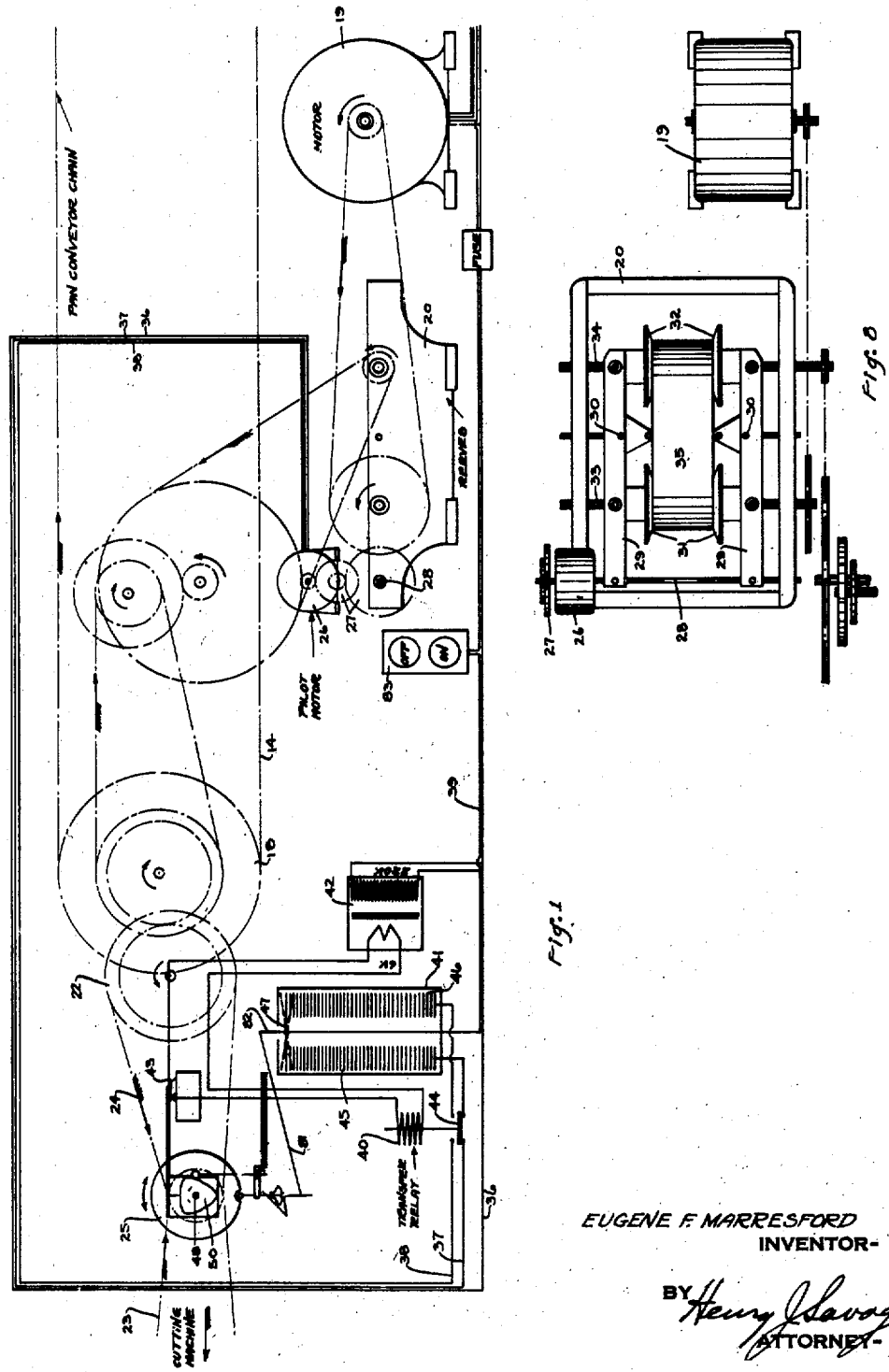

EUGENE F. MARRESFORD
INVENTOR-

BY Henry J Savage
ATTORNEY-

Nov. 24, 1936.  E. F. MARRESFORD  2,062,136
SPEED SYNCHRONIZING DEVICE
Filed March 20, 1934  6 Sheets—Sheet 5

EUGENE F. MARRESFORD
INVENTOR-

BY Henry J Savage
ATTORNEY-

Nov. 24, 1936.   E. F. MARRESFORD   2,062,136
SPEED SYNCHRONIZING DEVICE
Filed March 20, 1934   6 Sheets-Sheet 6
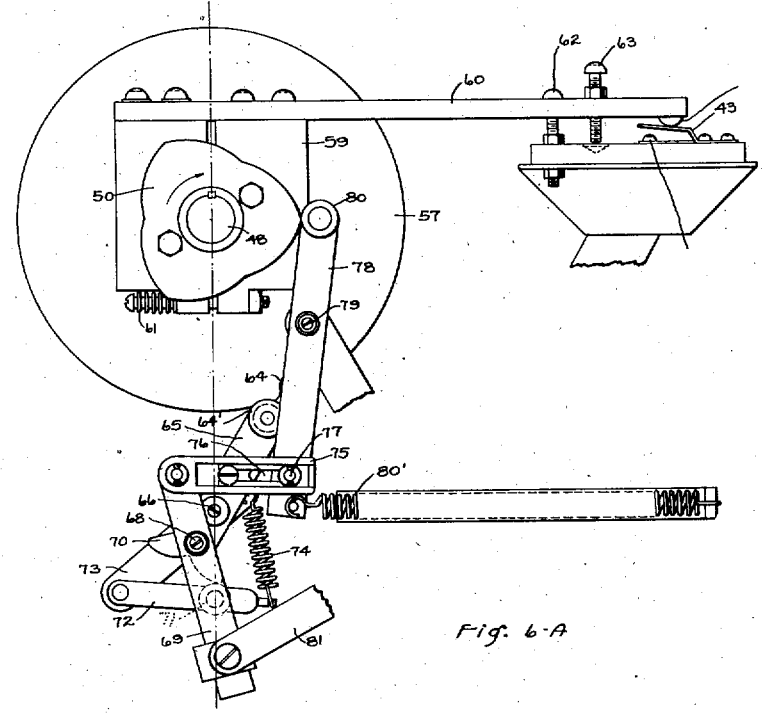
Fig. 6-A
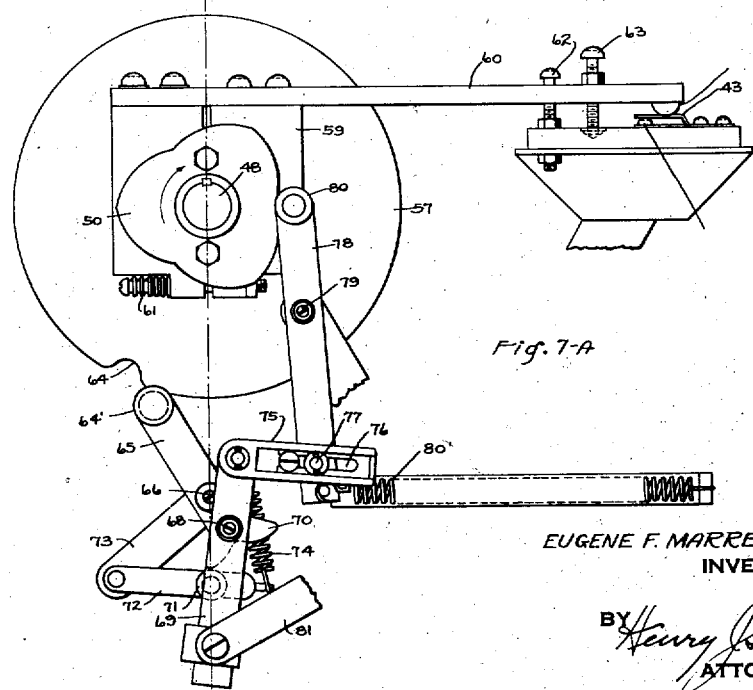
Fig. 7-A
EUGENE F. MARRESFORD
INVENTOR-
BY Henry Savage
ATTORNEY- Patented Nov. 24, 1936

2,062,136

UNITED STATES PATENT OFFICE

2,062,136

SPEED SYNCHRONIZING DEVICE

Eugene F. Marresford, Brooklyn, N. Y., assignor to National Biscuit Company, New York, N. Y., a corporation of New Jersey Application March 20, 1934, Serial No. 716,466

25 Claims. (Cl. 74—395)

My invention relates to speed synchronizing devices and particularly to mechanism for synchronizing the speeds or maintaining a constant speed ratio between two independently driven units, and also to maintain the units in constant phase or step.

In automatic ovens for baking biscuit, crackers, and the like, wherein my invention finds a useful application, there are two co-ordinated units: namely, the oven conveyor carrying the baking pans, and the cutting and panning machine which cuts out the biscuit and delivers them in spaced batches onto the pans. For mechanical reasons, it is preferred to drive the units from independent drives or motors, but this makes it necessary not only to provide means to keep a constant speed ratio between the cutter and oven conveyor, but also to keep them in constant phase or step. Usually, there is a margin of from ½ inch to 1 inch between the first and last rows of biscuits on a pan and the ends of the pan; that is, a batch of biscuit extends to within 1 inch to ½ inch of the ends of the pan, the margin varying with the size and spacing of the biscuit. It is necessary that not only the speed ratio between pans and cutter be maintained within very narrow limits, but the pans and cutter must be kept accurately in phase or step, otherwise, the margin of ½ inch to 1 inch will be destroyed and the end row of biscuits of a batch or pan load will be deposited on the space between adjacent pans. If there be a change in the speed ratio between pans and cutter, the one will gain or lose on the other so that the margin between the batch of biscuit and edges of the pan will increase at one end and decrease at the other. If the speeds now be corrected, these margins will remain unequal; that is, the pans and cutter, although running at the correct relative speeds, are slightly out of phase or step. It is necessary to correct not only the speed ratio but also relative positions of the biscuit-depositing means and pans so that the desired margins can be maintained approximately equal at the two ends of the pans.

It is also essential, in a speed control device of this kind, that it operate to correct very small variations in speed ratio or phase, because of the very narrow margins between biscuit and the ends of the pans. It is also desirable that there be no violent "surging" or "hunting" of the speeds when correction is made. For example, if pan speed increases, say, 1/10 of 1% above normal and correction is made to bring it down to normal speed, the tendency is, due to the inertia of the parts and their sluggishness in responding to changes, to over-correct so that there follows an error in the opposite direction. This, in turn, will produce another over-correction, these over-corrections gradually subsiding until equilibrium is re-established.

Speed control devices as heretofore used have had the above defects; that is, they correct for speed only and do not automatically restore the two machines to step or synchronism. Also, due to the inertia of the variable speed drives, they do not operate to correct variations in speed until a considerable correction is required, and then, when correction is made, the inertia or sluggishness of the variable speed drive in responding to adjustments causes an almost equal error in the opposite direction. This results in rather violent surging of the machines, and, in addition to this, frequent manual adjustment is necessary to keep the cutting and panning machines in step or phase with the oven conveyor.

The present invention overcomes the above noted disadvantages that have existed in prior synchronizing devices and not only maintains a constant speed ratio between the two units but also returns them to phase or step in case correction is necessary and prevents over-correction or "surging" except to the slight extent necessary to bring them back into step. For example, the speed of the oven conveyor may increase so that the pans gain slightly on the cutting machine. When the pans have gained a small amount, say, about ¼ inch, the regulator will operate to bring the speed of the conveyor back to normal; but, if this were the only correction made, the conveyor or pans would then remain ¼ inch ahead of the cutter, although now running at proper speed. It is therefore necessary to make a further correction to bring the pans back into exact step or phase with the cutter. This may be done by over-correcting the conveyor speed so that it will run slightly slower than normal until it has lost ¼ inch on the cutter and the two are again in step. Another advance is then made in the speed of the conveyor and the operation continued as often as may be necessary to effect complete correction in speed and phase.

In the accompanying drawings I have illustrated one form that my invention may take and that accomplishes the above advantages and objects, and still others that will be apparent to those skilled in this art.

Fig. 1 is a diagrammatic representation of parts of an automatic oven with my speed synchronizing device applied thereto.

Figs. 6, 6A and 7, 7A show different positions or stages in the operation of the control unit.

Fig. 8 is a plan view of a commercial variable speed drive that may be used with my invention and an auxiliary motor for shifting the drive to vary its speed.

Figure 2:
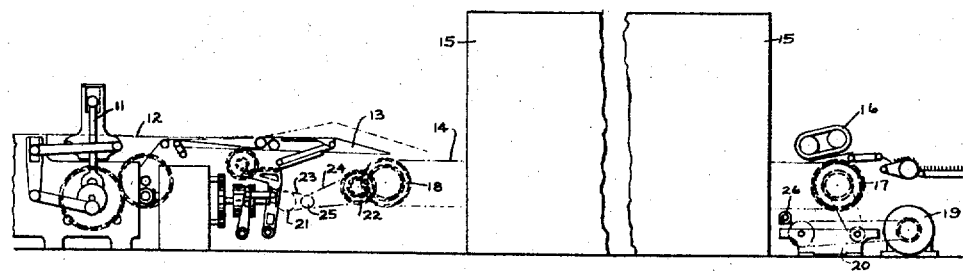
Fig. 2 is a diagrammatic representation of a modern automatic oven controlled by my synchronizing device.

Referring first to Fig. 2, 11 indicates a biscuit cutter which cuts out the biscuit from a sheet of dough on an endless apron 12, from which they are delivered by a reciprocating panner blade 13 in spaced batches to pans carried by an endless oven conveyor 14. This conveyor is loaded with biscuit at one end where it enters the oven 15 and at the opposite end, where it emerges from the oven, is unloaded by an automatic unloader 16. This conveyor chain may be several hundred feet in length and, at its discharge or unloading end, passes around a driving sprocket 17, and, at its loading end, around a sprocket 18. The sprocket 17 preferably is driven by a motor 19 through a suitable variable speed drive 20, such as the Reeve's drive indicated in Fig. 8 of the drawings.

The cutter 11 and panner 13 are parts of a unitary cutting and panning machine driven by an independent motor or other power unit, not shown. This machine drives a sprocket 21, and another sprocket 22 is driven from the oven conveyor sprocket 18. Thus the speeds of the respective sprockets 21 and 22 bear fixed ratios to the speeds of the cutting machine 11 and oven conveyor 14 from which they are driven by gears or chains and sprockets so that the ratios cannot vary except by actual adjustment; i. e., once the ratios are determined and proper sizes selected for gears or sprockets, they remain constant for that setting of the machines.

The sprockets 21 and 22 are connected by chains 23, 24 to drive the speed control unit 25, indicated diagrammatically in Fig. 2, but shown in detail in Figs. 3 to 7.

As shown in Fig. 2, the motor 19 for driving the oven chain preferably is placed at the end of the conveyor remote from the cutting machine 11. The control unit 25 is connected to correct the speed of either the motor for driving the oven conveyor, or for driving the cutting machine, as may be preferred for each particular installation. In the embodiment of the invention illustrated herein, I show it as controlling the oven drive motor 19.

Referring, now, to Fig. 1, I show the motor 19 and variable speed gear 20 connected to drive the front oven sprocket 18; but this is for convenience of illustration, only, and to enable all of the parts to be represented in one figure. In practice, the motor 19 may be connected to drive either sprocket 17 or 18, or an intermediate drive sprocket engaging the oven conveyor chain 14 at any suitable place in its length.

The speed control unit 25 operates to control a reversible pilot motor 26 (Figs. 1 and 8), which is connected by a train of gears 27 to the adjusting screw 28 of the variable speed drive 20. When the motor 26 is driven in one direction, the adjusting levers 29 are rocked about their pivots 30 to separate the driving cones 31 and bring the driven cones 32 closer together, the driving and driven cones being splined to the shafts 33, 34. The cones 31, 32 are engaged by a V-belt 35, the effective driving radius of which varies inversely with the axial distance between the units of each pair of cones. When the cones are shifted to vary the speed, the belt 35 does not respond immediately to the adjustment, but is rather sluggish in changing its position, so that, if the cones 31 be separated and cones 32 be shifted closer together, the belt 35 will not reach a position of equilibrium until some time after the screw 28 and pilot motor 26 have stopped. As a result, when a change in speed of the driven shaft 34 is desired, the motor 26 will rotate the screw 28 too far and there will be an over-correction or too great change in speed when the belt 25 finally finds its new running position for the adjustment.

My invention prevents this over-correction by causing the pilot motor to operate by a series of short, spaced impulses, as distinguished from a sustained drive, so that the belt 35 may attain a position of equilibrium between impulses. When adjustment has thus been made to correct speed variation, a slight over-correction is then made to bring the two units, cutter and oven, back into exact registry.

The pilot motor 26 has two windings for driving it in opposite directions having a common wire or conductor 36 (Fig. 1), and each an independent wire or conductor 37, 38. The conductors 37, 38 are adapted to be connected to a common wire 39, so that the circuit through one winding comprises the wires 36, 37, 39; and the other comprises the wires 36, 38, 39. Each conductor 37, 38 is connected to two controls: namely, one side of a transfer relay 40 and one side of a carbon pile rheostat 41. Both the transfer relay and rheostat must be closed on the proper sides for the pilot motor to run. This gives four operating conditions in the motor circuits, under two of which the motor runs and two when it does not run. The relay 40 is energized by current from a transformer 42 through the relay direction control switch 43 in the transformer secondary circuit. The armature of the relay carries a contact or switch 44 for opening or closing the conductors 37, 38. The rheostat 41 has a carbon pile 45 connected to the conductor 37 and a pile 46 connected to the conductor 38. These piles are controlled by an oscillating lever or control switch 47 actuated by the speed control unit 25.

Figure 5:
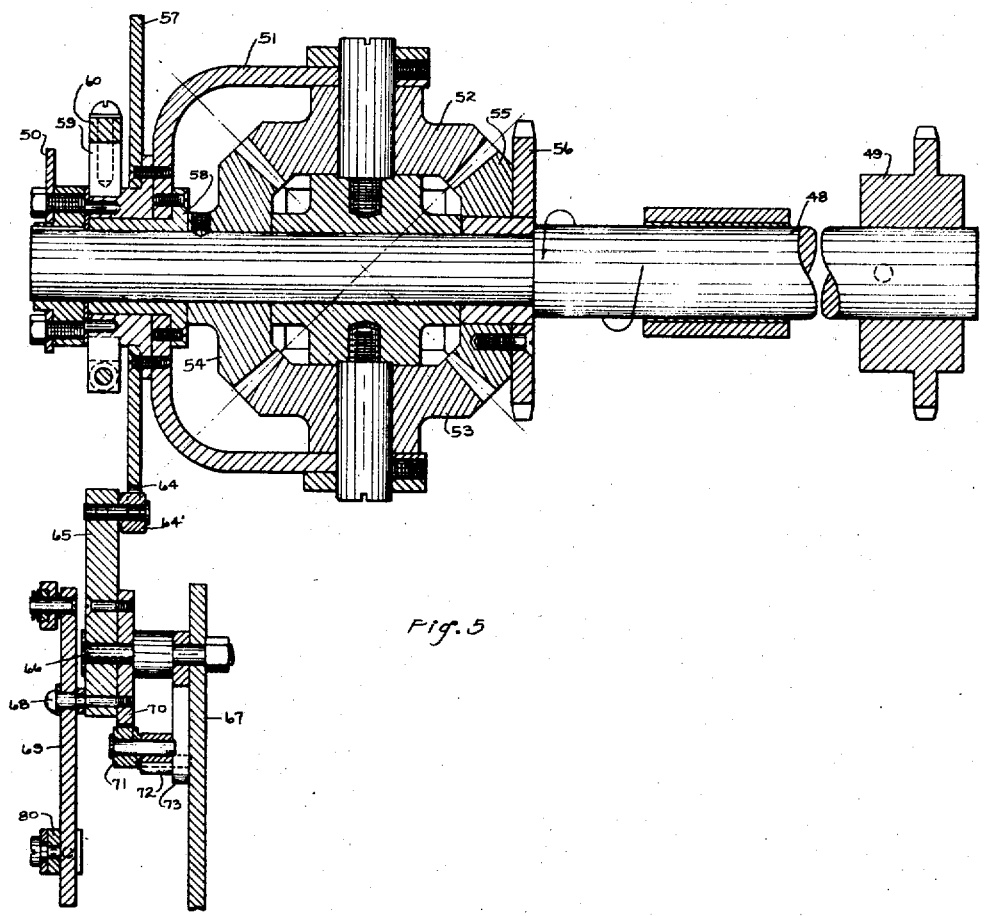
Fig. 5 is a sectional view taken on the line 5—5 of Fig. 3.
Figure 3:
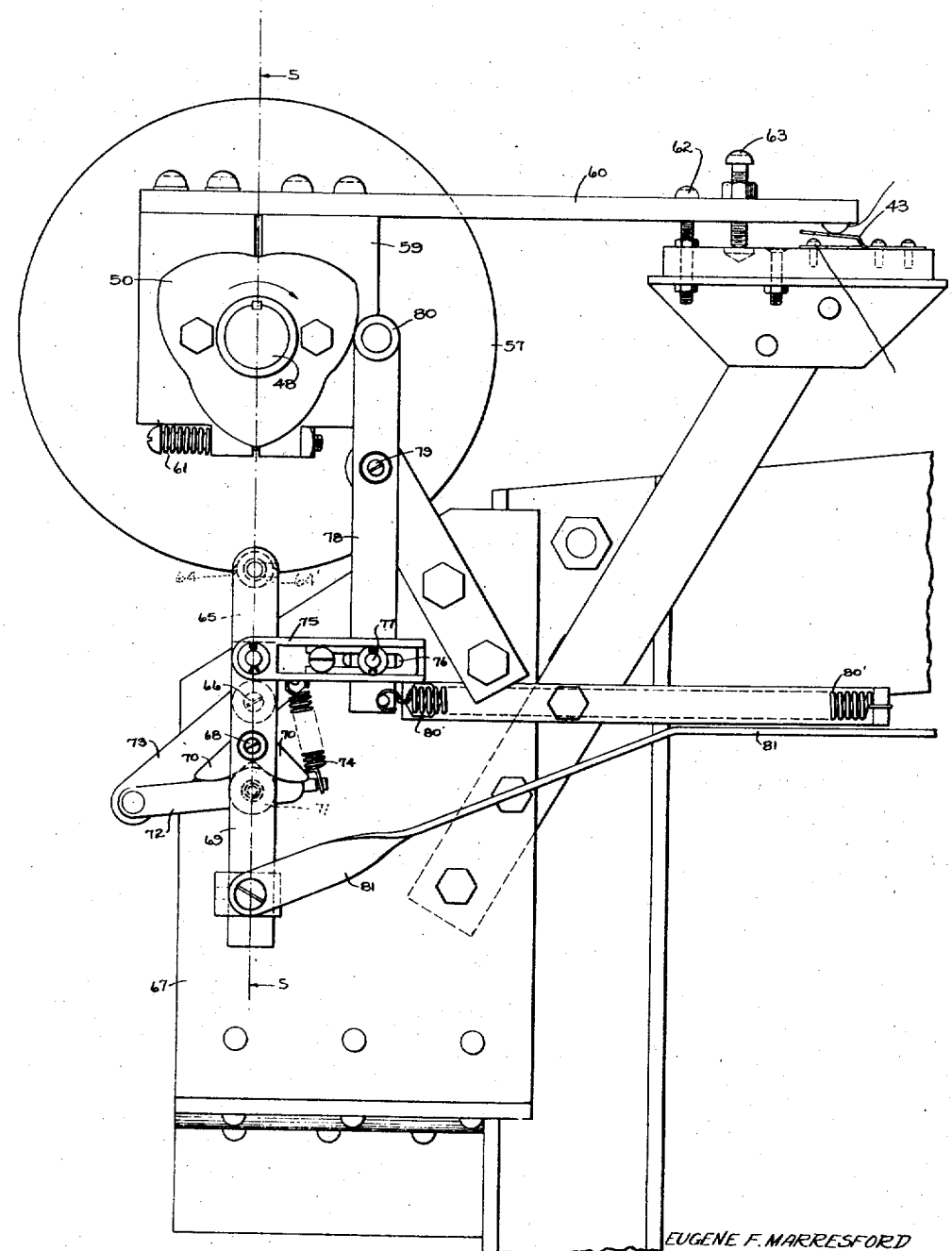
Fig. 3 is an end elevation of the speed control unit.
Figure 4:
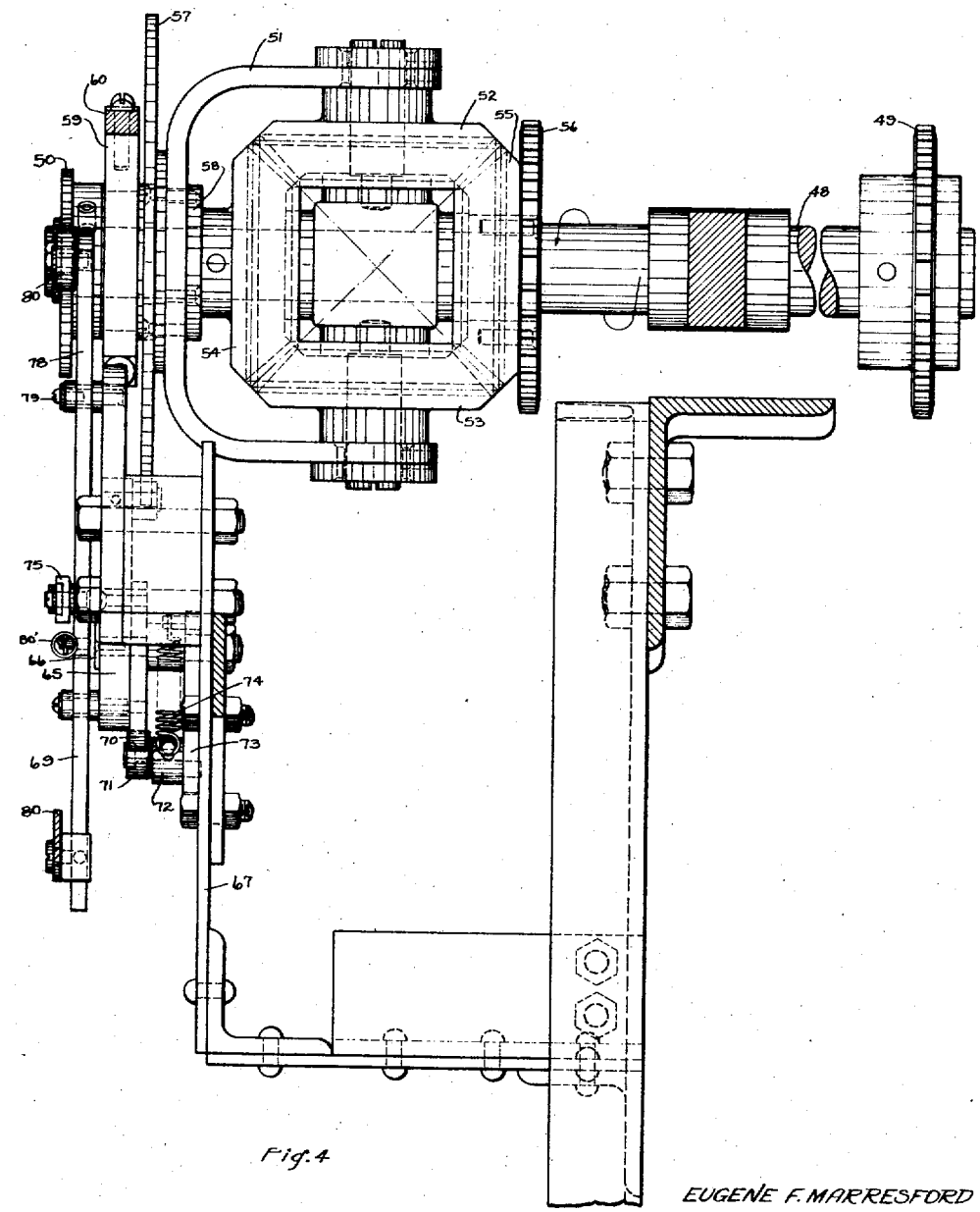
Fig. 4 is a side elevation thereof.

The control unit 25 is best shown in Figs. 3, 4, and 5 and comprises a shaft 48 mounted to rotate in suitable bearings. At one end, this shaft is keyed to a sprocket 49 which preferably is driven from the leading machine, in this case, the cutting and panning machine 11. The current pulsation cam 50 is keyed to the other end of this shaft adjacent a differential housing 51 rotatable on the shaft and having a pair of bevel pinions 52, 53 meshing with a bevel gear 54 keyed to shaft 48 and with a second bevel gear 55 rotatably mounted on the shaft. The gear 55 is fixed to a sprocket 56, which is driven by the chain 24 from the following or speed controlled machine, which, in this case, is the oven conveyor 14. The gears 54 and 55 are of the same size and the drives from the cutting machine and oven conveyor are selected so that the sprockets 49 and 56 are driven at exactly the same speed but in opposite directions. As long as these speeds remain equal, there will be no movement of the differential housing 51. But, as soon as there is a very slight difference in speeds, or the cutter and oven pans get the slightest bit out of registry or phase, the differential housing will make a partial rotation in one direction or the other and, through suitable controls, cause the pilot motor 26 to be energized and return the machines to synchronization.

The differential housing carries a speed-regulating cam 57 and has a sleeve 58, on which there is frictionally mounted a split disk 59, to which the relay control arm 60 is fixed. The split disk is held in frictional engagement with the sleeve 58 by a spring 61, the friction being sufficient to turn the disk 59 and impart a limited movement to the arm 60 upon movement of the housing 51 in either direction. Movement of the arm 60 opens or closes the relay control switch 43, the movement being limited by the screws or stops 62, 63 (Fig. 3).

The cam 57 has a recess 64 engaging a roller 64' on the upper end of a fulcrum shifter lever 65, pivoted at 66 on the fixed frame member 67, and at its lower end carrying a pin 68, on which the rheostat pulsating lever 69 is mounted. The lever 65 is forked below the pin 68 to provide a centering cam 70, which engages a roller 71 on the lever centering arm 72, pivoted at one end to the fixed arm 73 and at its other end being secured to the spring 74. The spring 74 pulls the roller 71 on arm 72 against the cam 70 and tends to return the lever 65 to its neutral position, as shown in Fig. 3.

At its upper end, the rheostat pulsating lever 69 is pivotally connected to an adjustable slip link 75 having an adjustable slot 76, in which a pin 77, secured to the current pulsating lever 78, has a sliding fit. The lever 78 is pivoted at 79 to a fixed bracket or part of the frame and at its free end carries a roller 80, which engages the pulsating cam 50. The pulsating cam 50 is shown with three lobes or rises, but any desired number can be provided. The cam 50 rotates constantly with the shaft 48, and, at each rotation, it actuates the current pulsating lever 78 to interrupt or vary the strength of the current to the pilot motor 26 as many times as it has rises. This interruption of the current, causing a series of intermittent impulses to the motor 26, prevents excess over-travel of the motor 26 and resultant over-correction. The roller 80 is held in contact with the cam 50 by a spring 80' attached to the lower end of the lever 78.

The lower end of the rheostat pulsating lever 69 is adjustably connected to one end of a link 81, the other end of which is connected to the operating arm 82 of the rheostat control switch 47 (Fig. 1).

The operation of the control unit is best understood from Figs. 3, 6, 6A, 7, and 7A, to which reference will now be had. In each of these figures, the arrow indicates the direction of rotation of the shaft 48 and pulsation cam 50. In Fig. 3, the parts are in their normal or inactive positions which they occupy when the cutting machine and oven conveyor are running at normal speeds and the panner and oven pans are in phase, and the centers of the levers 65, 69, and their pivotal connections all lie in the same plane with the axis of the shaft 48.

Figure 6:
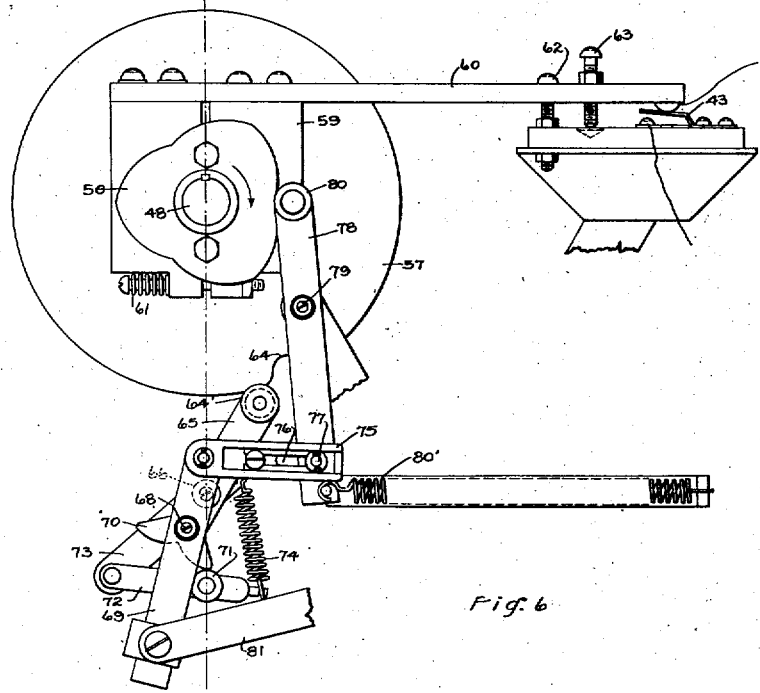

Figs. 6 and 6A show the operation of the speed control unit when the oven conveyor has gained on the cutting machine, or conversely when the cutting machine has lost speed relative to the conveyor.

Figure 7:
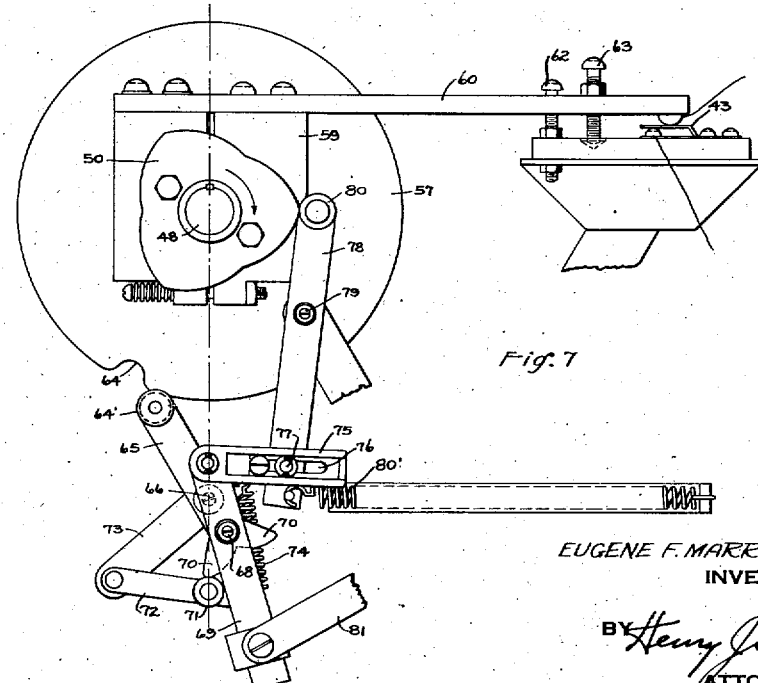

Figs. 7 and 7A show the operation of the speed control unit when the oven conveyor has lost speed relative to the cutting machine, or the cutting machine has gained on the conveyor.

Referring, now, to Figs. 6 and 6A, the oven conveyor and cutting machine are out of step or phase because the conveyor has gained on the cutting machine. This has caused the differential housing 51 to rotate slightly with the sprocket 56, which is geared to the oven conveyor (Fig. 5) and carry the speed regulating cam 57 with it. This rotation is counter-clockwise, turning the notch 64 to the right (Fig. 6) which, by reason of its engagement with the roller 64' on the fulcrum shifter lever 65, causes the lever to swing about its pivot point 66 and to swing the fulcrum 68 of the rheostat pulsating lever 69 to the left. At the same time, the forked cam 70 on the lower end of lever 65 presses down on the roller 71 against the tension of spring 74. The pull of this spring on lever 72 and roller 71 tends to return lever 65 to normal position. When the fulcrum 68 is shifted to the left, it carries the lever 69 bodily with it. This causes the lever 69 to turn on its fulcrum 68, in one direction or the other, dependent upon the position of the roller 80 on the current pulsation cam 50 which is rotating continuously with the shaft 48. The spring 80' keeps the pin 77 on the lever 78 against the right-hand end of the slot 76. When the roller 80 is in one of the depressions of the cam 50 (Fig. 6), the spring 80' pulls the lower end of the current pulsating lever 78 and the top end of the rheostat pulsating lever 69 to the right. This shifts the lower end of lever 69 to the left and pulls the link 81 so as to cause the rheostat control switch 47 (Fig. 1) to make contact with the carbon pile 45 which is connected with the conductor 37. When the cam 57 turned counter-clockwise, as is now being considered, (Fig. 6), the split fibre disk 59 tended to rotate with it; but its motion is limited by the arm 60 coming in contact with the stop 62. The switch 43, therefore, remains open, and the contact 44 closes the conductor 37. The circuit is now completed through conductors 36, 37, switch 44, pile 45 and conductor 39 to the pilot motor 26, (Fig. 1). This energizes the motor windings to cause motor 26 to rotate the screw 28 and shift the variable speed drive 20 to slow down the oven conveyor 14. The impulse to drive the motor 26 is nearly instantaneous, because the continued rotation of cam 50 interrupts the current three times during each rotation of the shaft 50. This causes the motor 26 to be driven by a series of short impulses which continue until the speed has been corrected and the cam 57 starts its return to normal position. This prevents any appreciable over-correction of the variable speed drive 20. When the cam 50 has rotated, as in Fig. 6A, the lower end of lever 78 is forced to the left, which permits the rheostat pulsating lever 69 to assume the position shown therein, which shifts link 81 to the right and tilts the control switch 47 out of contact with the pile 45 (Fig. 1). This breaks the circuit through conductor 37 and interrupts the flow of current to the pilot motor 26. The rheostat 41 is not per se a part of the present invention but is a commercial article for sale on the open market. This rheostat 41 is illustrative of any suitable means that may be used for varying the effective current to the pilot motor. Such rheostats are equipped with a spring (not shown) inside the casing, which tends to hold or return the switch 47 to neutral position out of contact with both piles 45, 46. It is this spring operating through link 81 that shifts the lever 69 to neutral position as shown in Figs. 6A and 7A.

The cam 57 having been rotated as in Figs. 6 and 6A, the intermittent impulses will be imparted to the pilot motor 26 and the variable speed drive 20 adjusted until the speeds of the sprockets 49, 56 again become equal. This corrects for the variation or error in speed between the oven conveyor and cutting machine, but the two must be returned to phase or step as well. If no further correction were now made, the oven pans would remain a short distance out of registry with the cutting and panning machine. Exact registry will be re-attained when the cam 57 is returned to neutral position as in Fig. 3. The position of the cam 57 and housing 51 with respect to neutral position is indicative of the degree of registry as respects speed or phase of the two conveyors or machines. When the machines are exactly in registry or phase, the housing and cam will always be in this neutral position, but displacement from it in either direction indicates that correction is necessary either as respects registry or both speed and registry. Thus the recess 64 and the roller 64' serve as a visible gauge or index of speed and registry conditions. Whenever the cam 57 is moving away from the position of registry it indicates that speed correction is necessary, but when the cam is displaced from neutral position but stationary or returning toward neutral position it indicates that speed correction has been attained and the machines are being returned to exact registry or phase.

Returning, now, to Figs. 6 and 6A, and assuming that the cam 57 has been turned out of normal position long enough to synchronize the speeds of the conveyor and cutting machine, the operation will continue until the speed of the conveyor becomes less than normal by a very small or almost infinitesimal increment. This causes the differential housing 51 and cam 57 to start to creep backward or clockwise until they reach their neutral positions, as in Fig. 3. The baking pans and cutting machine are then in exact registry again. When the cam 57 starts its return movement to neutral position, it carries the disc 59 and relay control arm 60 with it so as to close the relay control switch 43. This energizes the relay 40 (Fig. 1) and opens the switch 44 in conductor 37 and closes the switch in conductor 38. The pilot motor circuit is then open and no further impulses are imparted to it during the return movement of cam 57. When the cam 57 reaches neutral position on its return movement, the slight overcorrection of the oven conveyor continues and carries the cam 57 very slightly beyond neutral position. This then causes a correction to be made in the opposite sense to bring the cam 57 back to neutral position a second time. Usually, this will be sufficient, because the regulator is so sensitive that it operates to correct such small errors in speed or registry that the pans on the oven conveyor seldom get more than 1/8 inch out of registry, and in practical operation, the cutting machine and oven pans never get far enough out of exact registry as to prevent proper deposit of the batches of biscuit on the pans. The only time when the two conveyors can get far out of registry is when starting up or through accident or deliberate intent. But in case a large error should occur, and a relatively large correction be required, of say an inch or more, the over-correction in the first instance that carries the cam 57 past its neutral or normal position will be very small, because upon the slightest change in speed beyond exact equalization, the differential housing 51 begins its retrograde movement which changes the position of the relay control switch 43 and prevents further speed change. When the conveyors are far out of registry so that the rate of speed change or acceleration of the controlled conveyor is a maximum, the over-correction may continue long enough past the point of equalization that the housing 51 and cam 57 will be returned past neutral or center position far enough to require material correction in the opposite direction, but this is an abnormal condition of operation. In any case over-correction of the oven conveyor is so gradual that violent surging is avoided, and usually is so small as to be imperceptible.

As stated above, the rheostat 41 is a common article of commerce and the current flowing through the pile 45 or 46 is proportional to the pressure exerted on that pile by the control switch 47. The pressure exerted upon the piles is governed by the shifting of the fulcrum 68 as determined by the displacement of the fulcrum shifting lever 65. When the cam 57 rotates, the lever 65 is tilted and the fulcrum 68 shifted an increasing amount up to the point where the roller 64' is entirely free from the notch 64. Thereafter, continued rotation of cam 57 does not produce any further effect on the position of the lever 65 or fulcrum 68. In the embodiment of the invention illustrated, this maximum shifting of fulcrum 68 is reached when the cam 57 has rotated through about 25°. It will be seen that the rate of correction or rate of speed change depends on the angular displacement of lever 65 up to an angle of 25°. This results in a condition of extreme sensitiveness and stability of the control means when lever 65 is only slightly displaced, varying to a condition of rapid correction when the lever 65 is greatly displaced. Thus, any degree of fast or slow correction will be produced as determined by the amount of difference of speed or registry between the cutting machine and the oven conveyor.

Figs. 7 and 7A show the operation of the speed regulator when the oven conveyor has lost speed relative to the cutting machine. This will cause the cam 57 to turn clockwise and carry the disc 59 and relay control arm 60 with it to close the relay direction switch 43. This energizes the relay 40 and lifts the switch 44 to open the circuit through conductor 37 and close it through conductor 38. The notch 64 carries the roller 64' to the left and shifts the fulcrum 68 to the right. Now, whenever the roller 80 rides up on one of the crests of the cam 50, the pin 77 will contact with the left-hand end of the slot 76 and tilt the rheostat pulsating lever 69 about its fulcrum 68 and through link 81 press the switch 47 against the pile 45 (Fig. 1). This completes the pilot motor circuit through conductor 38, switch 44, pile 46, conductor 39, and conductor 36. This imparts an impulse to the motor to drive it in such direction as to rotate screw 28 (Fig. 8) to increase the speed of the variable speed drive. This motor circuit is interrupted three times for each rotation of shaft 48, or each time the roller 80 reaches a low point on cam 50. Fig. 7A shows the position of the parts when the current is interrupted. When the roller 80 is on a low point of cam 50, the lower end of lever 78 is swung to the left, which permits the centering spring (not shown) in the rheostat 41 to shift the link 81 and lever 69 to the left and release the pressure of switch 47 on the pile 46.

While I have shown my speed regulator as operating on the variable speed drive of the following machine (the oven conveyor in this case), it may, in many instances, be best applied to a variable speed drive connected to the leading machine (cutting and panning machine in this case), and will operate equally well. In fact, it may generally be preferred to have the speed regulating unit control the drive to the cutting machine, instead of the oven conveyor. The speed of the oven conveyor is determined by the time that it takes to bake the particular piece of goods that is being made and depends both on the kind of goods and the oven temperature. It is usually preferred to provide means for manually adjusting the speed of the oven conveyor, because oven temperatures and baking time will vary, even with the closest of temperature regulation. If the oven conveyor is manually regulated from time to time, and the automatic regulator applied to the cutting machine, the latter will automatically follow any manual adjustments of the former and keep the two always synchronized.

In practice, the cam 57 is almost constantly in motion or "hunting" a position of equilibrium. This movement is very slight and, while partly due to speed variations in the cutting machine and oven conveyor, is also in part due to the sensitiveness of the regulator and inevitable lost motion or loose connections among the several parts.

In devices of this character, it is necessary, or at least highly desirable, to be able to operate the oven conveyor independently of the cutting and panning machine. The oven conveyor is very long, and a considerable time interval is consumed in its travel through the oven. When the cutting machine has completed its day's run or finished a batch of dough, the conveyor is, of course, filled with biscuit varying from dough to fully baked. It is now desirable to shut down the cutting machine, but the oven conveyor must continue to run until all the biscuit are fully baked. Also, when starting the machine, it is desirable to run the conveyor through the oven at least once for preliminary heating of the baking pans before the cutter is started. This can be done with my invention merely by pressing the "off" switch 83 (Fig. 1) in the pilot motor circuit, which prevents the pilot motor 26 from operating. The motor driving the cutting machine is then stopped, and the oven conveyor can be driven independently as long as desired.

When it is desired to start the machine anew, it is not necessary to first secure or adjust for registry or step of the two units. It is only necessary to start both motors, whereupon the synchronizing device 25 operates to bring the two units into phase or step, usually within the length of one baking pan, but at most within a distance of travel not to exceed three or four pan lengths. This is accomplished by gearing the differential unit drive sprockets 49 and 56 to the cutting machine and oven conveyor in such ratios that, when the cutting machine and oven conveyors are running at different speeds, during the time that a difference of travel equal to one pan length of conveyor occurs, the cam 57 makes one revolution. The displacement of cam 57 then indicates the degree of registry and can be calibrated to measure registry displacement in degrees of a cycle or in inches of conveyor length.

The carbon pile rheostat and its operating parts, including link 81, pulsating lever 69, slip link 75, and lever 78, necessarily operate with considerable lost motion. This combined lost motion, plus other play in the control mechanism, is just sufficient so that oscillation of the lever 69, when the control cam 57 is in neutral position (Fig. 3), will make the rheostat immediately operative upon the slightest displacement of lever 65. For maximum sensitiveness of control, the oscillation of pulsating lever 69, when cam 57 and lever 65 are in neutral position, is such that current will flow through motor 26 just insufficient to cause the motor to rotate. Then, the slightest rotation of cam 57 will cause sufficient increase in the current to rotate motor 26.

While I have referred to the current supplied to the motor 26 as an intermittent current, it is not always truly intermittent; but I use the term as applying equally to the current of fluctuating value that is supplied to the motor when the cam 57 is displaced through a considerable angle. In such a case, the current is constantly fluctuating but is not completely interrupted until the cam 57 starts its return movement.

It is understood that my invention is not limited to the embodiment illustrated, and that the terms used are illustrative only and not used in a limiting sense. For example, while I show and claim the driven unit 14 as an oven conveyor and the driven unit 12 as a cutting and panning machine, either or both of these parts may be any driven unit to the regulation or control of which my synchronizing device may be applicable, and, similarly, other parts and elements may have wide ranges of equivalents.

Having thus described and illustrated one form of my invention, I claim all modifications and variations thereof that may come within the scope of the following claims:

1. In a speed synchronizing device, the combination of delivery and receiving conveyors, independent driving means for each conveyor, and control means for maintaining a constant speed ratio and registry between said conveyors comprising a variable speed drive between one of said driving means and its conveyor, a differential gear having a casing normally in a definite neutral position but displaced from its neutral registry by variations in the relative speeds or position of said conveyors, driving connections from said conveyors to the respective sides of said differential gear, said driving connections being such that said conveyors are in registry when said casing is in neutral position, means controlled by displacement of said casing to adjust said variable speed drive to correct the relative speeds of said conveyors and means to return said differential casing to its neutral position and said conveyors into registry.

2. In a speed synchronizing device, the combination of delivery and receiving conveyors, independent driving means for each conveyor, a variable speed drive between one of said driving means and its conveyor, and control means for maintaining a constant speed ratio and registry between said conveyors comprising differential gearing having a casing normally in neutral position but displaced from its neutral registry by changes in the relative speeds or position of said conveyors, driving connections from said conveyors to the respective sides of said differential gear, said driving connections being such that said conveyors are in registry when said casing is in neutral position, a reversible motor for adjusting said variable speed drive, and means controlled by the direction of displacement of said differential casing to energize said reversible motor and adjust said variable speed drive to restore the relative speeds of said conveyors and means to return said casing to neutral position and said conveyors into registry.

3. In a speed synchronizing device, the combination of delivery and receiving conveyors, independent driving means for each conveyor, a variable speed drive between one of said driving means and its conveyor, and control means for maintaining a constant speed ratio and position between said conveyors comprising differential gearing driven from said conveyors and having a casing displaced from its neutral position by changes in the relative speeds or position of said conveyors, a reversible motor for adjusting said variable speed drive, and means controlled by the direction of displacement of said differential casing to energize said reversible motor by intermittent impulses to adjust said variable speed drive to restore the relative speeds and position of said conveyors.

4. In a speed synchronizing device, the combination of a variable speed drive, a reversible motor for adjusting said drive, a differential gear having a casing normally stationary in neutral position, means for normally driving the opposite sides of said gear at equal speeds, two electric circuits for said reversible motor, and means controlled by displacement of said differential casing in either direction to close one of said circuits to drive said reversible motor to adjust said variable speed drive, and means to restore said casing to neutral position.

5. In a speed synchronizing device, the combination of a variable speed drive, a reversible motor for adjusting said drive, a differential gear having a normally stationary casing, means for normally driving the opposite sides of said gear at equal speeds, two electric circuits for said reversible motor, and means controlled by displacement of said differential casing in either direction to intermittently open and close one of said circuits while said casing is being displaced to drive said reversible motor to adjust said variable speed drive.

6. In a speed synchronizing device, the combination of two independently driven conveyors, a variable speed drive for one of said conveyors, a reversible motor for adjusting said variable speed drive, two electric circuits for said motor, a speed regulating cam, means normally holding said cam in neutral position, means driven from said conveyors for rotating said cam in one direction or the other upon change in the speed ratio or relative positions of said conveyors, means controlled by the direction of rotation of said cam to close the corresponding one of said circuits to drive said reversible motor, and means for intermittently breaking said circuit when said cam is rotated.

7. In a speed synchronizing device, the combination of two independently driven conveyors, a variable speed drive for one of said conveyors, a reversible motor for adjusting said variable speed drive, two electric circuits for said motor, a speed regulating cam, means normally holding said cam in neutral position, means driven from said conveyors for rotating said cam in one direction or the other upon change in the speed ratio of said conveyors, means controlled by the direction of rotation of said cam to close the corresponding one of said circuits to drive said reversible motor, means for intermittently breaking said circuit when said cam is rotated, and means for returning said cam to neutral position when the motor has adjusted said variable speed drive to restore the speed ratio between said conveyors.

8. In a speed synchronizing device, the combination of an oven conveyor, a delivery apron, independent driving means for said conveyor and apron, a variable speed drive interposed between one of said driving means and its driven element, a differential gear having two gears driven in opposite directions and a rotatable housing normally in neutral position, driving connections between said two gears and said conveyor and apron respectively for normally driving said gears at equal speeds, a cam connected to rotate with said housing, a reversible motor connected to adjust said variable speed drive, and means connecting said cam and motor whereby movement of said cam produced by differential rotation of said two gears will drive said motor to adjust said variable speed drive to equalize the speeds of said two gears, and means operating when the speeds of said two gears have been equalized to return said cam and casing to neutral position.

9. In a speed synchronizing device, a differential gear having a pair of gears normally driven at equal speeds in opposite directions and a rotatable casing that is normally stationary but rotatable by differential rotation of said pair of gears, a reversible motor, two electric circuits connected to drive said motor in opposite directions, means controlled by displacement of said casing in one direction to energize one of said circuits, means controlled by displacement of said casing in the opposite direction to energize the other of said circuits, and means operated by said motor upon energization of one of said circuits caused by displacement of said casing to return said casing to neutral position and to again equalize the speeds of said gears.

10. In a speed synchronizing device, a differential gear having a pair of gears normally driven at equal speeds in opposite directions and a rotatable casing that is normally stationary but rotatable by differential rotation of said pair of gears, a reversible motor, two electric circuits connected to drive said motor in opposite directions, means controlled by rotation of said casing in one direction to energize one of said circuits, means controlled by rotation of said casing in the opposite direction to energize the other of said circuits, means operated by said motor upon energization of said circuits to return said casing to neutral position and again equalize the speeds of said gears, and means for opening said closed circuit until said casing is returned to neutral position.

11. In a speed synchronizing device, the combination of two driven units, independent driving means therefor, a variable speed drive interposed between one of said driving means and its driven unit, a differential gear having two gears driven in opposite directions and a rotatable housing normally in neutral position, driving connections between said two gears and said driven units, respectively, for normally driving said gears at equal speeds, a reversible motor connected to adjust said variable speed drive, means connecting said differential casing and motor whereby rotation of the casing produced by differential rotation of said gears will energize said motor to adjust said variable speed drive, and means to prevent continued energizing of said motor while said casing is returning to neutral position.

12. In a speed synchronizing device, the combination of a variable speed drive, means for adjusting said drive, a differential gear having a normally stationary casing, driving means for normally driving the opposite sides of said gear at equal speeds, and means controlled by displacement of said differential casing caused by a variation in the relative speeds of said driving means to actuate said adjusting means by a series of impulses for each displacement to restore the normal speed relationship of said driving means.

13. In a speed synchronizing device, the combination of a variable speed drive, means for adjusting said drive, a differential gear having a normally stationary casing, driving means for normally driving the opposite sides of said gear at equal speeds, one of said driving means being connected to said variable speed drive, means operable by displacement of said differential casing upon variations in relative speeds of said driving means to operate said adjusting means to equalize said speeds, means operable upon re-equalization of said speeds to prevent further relative change in said speeds, and means to return said casing to normal position after said speeds are equalized.

14. In a speed synchronizing device, the combination of a differential gear having a normally stationary casing, driving means for normally driving the opposite sides of said differential gear at equal speeds, adjusting means for one of said driving means, means operable by angular displacement of said casing caused by variation in relative speeds of said driving means to operate said adjusting means to correct said variation; and means whereby the rate of speed correction is proportional to the amount of angular displacement of said casing.

15. In a speed synchronizing device, the combination of a differential gear having a normally stationary casing, driving means for normally driving the opposite sides of said differential gear at equal speeds, adjusting means for one of said driving means, means operable by angular displacement of said casing caused by variation in relative speeds of said driving means to operate said adjusting means to correct said variation, means whereby the rate of speed correction is proportional to the amount of angular displacement of said casing, and means to return said casing to neutral position when speed variation is corrected.

16. In a speed synchronizing device, the combination of delivery and receiving conveyors, said receiving conveyor comprising a number of units, independent means for normally driving said conveyors in definite relation to each other, a differential gear having a casing normally stationary in neutral position, means for driving the two sides of said differential gear at equal speeds from said conveyor driving means, a speed regulating cam connected to said casing, the driving connections between said driving means and two sides of said differential gear being such that upon change in the relative positions of said conveyors equal to one unit's length of the receiving conveyor, said differential casing and cam will be displaced from neutral position one complete revolution, an adjusting unit connected to adjust one of said conveyor driving means, and means connecting said adjusting unit and regulating cam upon angular displacement of said speed regulating cam to restore said conveyors to their initial definite relation and said casing to neutral position.

17. In a speed synchronizing device, a differential gear having a pair of gears normally driven at equal speeds in opposite directions and a rotatable casing that normally is stationary in neutral position but rotatable by differential rotation of said pair of gears, means controlled by rotation of said casing in one direction to speed up one of said pair of gears to equalize their speeds and controlled by rotation of said casing in the opposite direction to retard said one gear to equalize their speeds and means functioning when said speeds have been equalized to return said casing to neutral position.

18. In a speed synchronizing device, the combination of a leading conveyor, a driving means therefor, manually controlled speed adjusting means for said driving means, a following conveyor, a variable speed drive for said following conveyor, a differential gear having a casing normally stationary in a definite position, the two sides of said gear being driven normally at equal speeds from said leading and following conveyors respectively and in such relationship that said casing is in its said definite position when said conveyors are in registry, and means operable by displacement of said casing from its definite position caused by speed or positional differences between said conveyors to adjust said variable speed drive to change the speed or position of the following conveyor into speed and positional registry with the leading conveyor regardless of initial speed and positional differences between said conveyors.

19. In a speed synchronizing device, the combination of leading and following conveyors adapted to operate in definite positional registry, independent driving means for said conveyors, manually controlled speed adjusting means for the driving means for said leading conveyor, a variable speed drive in the driving means for said following conveyor, a differential gear having a casing normally stationary in a definite position, the two sides of said gear being driven normally at equal speeds from said leading and following conveyors respectively and in such relationship that said casing is in its said definite position when said conveyors are in registry, and means operable by displacement of said casing from its definite position caused by positional changes between said conveyors to adjust said variable speed drive to change the position of said following conveyor to bring it into positional registry with the leading conveyor.

20. In a speed synchronizing device, the combination of a variable speed drive, a reversible motor for adjusting said drive, two circuits for said motor, means in each circuit for varying the effective current therein, a regulating cam normally in neutral position, connections between said regulating cam and said current varying means for energizing the respective circuits to drive said motor upon displacement of said cam in either direction, and means for varying the effective current in said circuits in proportion to the angular displacement of said cam.

21. In a speed synchronizing device, the combination of a variable speed drive, a reversible motor for adjusting said drive, two circuits for said motor, a regulating cam normally in neutral position, connections between said regulating cam and said circuits to energize the respective circuits to drive said motor upon displacement of said cam, and means to open the circuit and return said cam to neutral position when said motor has adjusted said variable speed drive.

22. In a speed synchronizing device, the combination of a variable speed drive, a reversible motor for adjusting said drive, two circuits for said motor, means in each circuit for varying the effective current therein, a regulating cam normally in neutral position, connections between said regulating cam and said current varying means for energizing the respective circuits to drive said motor upon displacement of said cam in either direction, means for varying the effective current in said circuits in proportion to the angular displacement of said cam, and means for periodically interrupting the energized circuit to drive said motor by impulses.

23. In a speed synchronizing device, the combination of a variable speed drive, a reversible motor for adjusting said drive, two circuits for said motor, a regulating cam normally in neutral position, connections between said regulating cam and said circuits to energize the respective circuits to drive said motor upon displacement of said cam, means for periodically interrupting the energized circuit to drive said motor by impulses, and means to open the circuit and return said cam to neutral position when said motor has adjusted said variable speed drive.

24. In a speed synchronizing device, the combination of delivery and receiving conveyors, independent driving means for each conveyor, a variable speed drive between one of said driving means and its conveyor, a differential gear having a pair of gears driven at equal speeds in opposite directions from said conveyors and a casing normally stationary in a definite neutral position, said casing being angularly displaced from neutral position by changes in the relative speeds or positions of said conveyors, adjusting means for said variable speed drive, means actuated by angular displacement of said casing to operate said adjusting means to adjust the variable speed drive and restore the speed relationship of the conveyors, and means operating thereafter to return said casing to neutral position and restore the positional relationship of the conveyors.

25. In a speed synchronizing device, the combination of delivery and receiving conveyors, independent driving means for each conveyor, control means for maintaining a fixed position of registry between said conveyors comprising a variable speed drive between one of said driving means and its conveyor, a differential gear having a casing normally in a definite neutral position but displaced from its neutral position by variations in the positions of said conveyors, driving connections from said conveyors to the respective sides of said differential gear, said driving connections being such that said conveyors are in registry when said casing is in neutral position, and means controlled by displacement of said casing to adjust said variable speed drive to return said differential casing to its neutral position and said conveyors into registry.

EUGENE F. MARRESFORD.

CERTIFICATE OF CORRECTION.

Patent No. 2,062,136.　　　　　　　　　　　　　　　　　　　　November 24, 193

EUGENE F. MARRESFORD.

It is hereby certified that error appears in the printed specification of the above numbered patent requiring correction as follows: Page 5, second column, line 49-50 and line 69, claims 1 and 2 respectively, for the word "registry" read position; and line 50-51 and line 70, same claims, for "position" read registry; and that the said Letters Patent should be read with these corrections therein that the same may conform to the record of the case in the Patent Office.

Signed and sealed this 16th day of March, A. D. 1937.

(Seal)　　　　　　　　　　　　　　　　　　　　　　　　　　Henry Van Arsdale
　　　　　　　　　　　　　　　　　　　　　　　Acting Commissioner of Patents.

bination of a variable speed drive, a reversible motor for adjusting said drive, two circuits for said motor, means in each circuit for varying the effective current therein, a regulating cam normally in neutral position, connections between said regulating cam and said current varying means for energizing the respective circuits to drive said motor upon displacement of said cam in either direction, means for varying the effective current in said circuits in proportion to the angular displacement of said cam, and means for periodically interrupting the energized circuit to drive said motor by impulses.

23. In a speed synchronizing device, the combination of a variable speed drive, a reversible motor for adjusting said drive, two circuits for said motor, a regulating cam normally in neutral position, connections between said regulating cam and said circuits to energize the respective circuits to drive said motor upon displacement of said cam, means for periodically interrupting the energized circuit to drive said motor by impulses, and means to open the circuit and return said cam to neutral position when said motor has adjusted said variable speed drive.

24. In a speed synchronizing device, the combination of delivery and receiving conveyors, independent driving means for each conveyor, a variable speed drive between one of said driving means and its conveyor, a differential gear having a pair of gears driven at equal speeds in opposite directions from said conveyors and a casing normally stationary in a definite neutral position, said casing being angularly displaced from neutral position by changes in the relative speeds or positions of said conveyors, adjusting means for said variable speed drive, means actuated by angular displacement of said casing to operate said adjusting means to adjust the variable speed drive and restore the speed relationship of the conveyors, and means operating thereafter to return said casing to neutral position and restore the positional relationship of the conveyors.

25. In a speed synchronizing device, the combination of delivery and receiving conveyors, independent driving means for each conveyor, control means for maintaining a fixed position of registry between said conveyors comprising a variable speed drive between one of said driving means and its conveyor, a differential gear having a casing normally in a definite neutral position but displaced from its neutral position by variations in the positions of said conveyors, driving connections from said conveyors to the respective sides of said differential gear, said driving connections being such that said conveyors are in registry when said casing is in neutral position, and means controlled by displacement of said casing to adjust said variable speed drive to return said differential casing to its neutral position and said conveyors into registry.

EUGENE F. MARRESFORD.

CERTIFICATE OF CORRECTION.

Patent No. 2,062,136.                                 November 24, 193

EUGENE F. MARRESFORD.

It is hereby certified that error appears in the printed specification of the above numbered patent requiring correction as follows: Page 5, second column, line 49-50 and line 69, claims 1 and 2 respectively, for the word "registry" read position; and line 50-51 and line 70, same claims, for "position" read registry; and that the said Letters Patent should be read with these corrections therein that the same may conform to the record of the case in the Patent Office.

Signed and sealed this 16th day of March, A. D. 1937.

(Seal)

Henry Van Arsdale
Acting Commissioner of Patents.

CERTIFICATE OF CORRECTION.

Patent No. 2,062,136.                                November 24, 1936.

EUGENE F. MARRESFORD.

It is hereby certified that error appears in the printed specification of the above numbered patent requiring correction as follows: Page 5, second column, line 49-50 and line 69, claims 1 and 2 respectively, for the word "registry" read position; and line 50-51 and line 70, same claims, for "position" read registry; and that the said Letters Patent should be read with these corrections therein that the same may conform to the record of the case in the Patent Office.

Signed and sealed this 16th day of March, A. D. 1937.

(Seal)
                                                Henry Van Arsdale
                                        Acting Commissioner of Patents.